United States Patent
Choi et al.

(10) Patent No.: US 6,818,349 B2
(45) Date of Patent: Nov. 16, 2004

(54) POSITIVE ACTIVE MATERIAL FOR RECHARGEABLE LITHIUM-SULFUR BATTERIES AND METHOD OF PREPARING SAME

(75) Inventors: Su-Suk Choi, Cheonan (KR); Ho-Jin Kweon, Cheonan (KR); Jun-Won Suh, Cheonan (KR); Jea-Woan Lee, Cheonan (KR); Ji-Seong Han, Kyungsangnam-do (KR)

(73) Assignee: Samsung SDI Co., LTD, Suwon-si (KR)

( * ) Notice: Subject to any disclaimer, the term of this patent is extended or adjusted under 35 U.S.C. 154(b) by 310 days.

(21) Appl. No.: 10/157,158

(22) Filed: May 30, 2002

(65) Prior Publication Data

US 2003/0082442 A1 May 1, 2003

(30) Foreign Application Priority Data

Oct. 27, 2001 (KR) ........................................ 2001-66536

(51) Int. Cl.$^7$ ................................................ H01M 4/58
(52) U.S. Cl. .................... 429/218.1; 429/232; 429/213; 429/231.8; 427/58
(58) Field of Search ............................ 429/218.1, 232, 429/213, 231.8; 427/58

(56) References Cited

U.S. PATENT DOCUMENTS

| | | | |
|---|---|---|---|
| 5,919,587 A | | 7/1999 | Mukherjee et al. |
| 6,030,720 A | * | 2/2000 | Chu et al. ................... 429/105 |
| 6,110,619 A | | 8/2000 | Zhang et al. |
| 6,153,337 A | | 11/2000 | Carlson et al. |
| 6,238,821 B1 | * | 5/2001 | Mukherjee et al. ......... 429/213 |
| 6,248,481 B1 | * | 6/2001 | Visco et al. ................ 429/340 |
| 6,406,814 B1 | * | 6/2002 | Gorkovenko et al. ....... 429/213 |

FOREIGN PATENT DOCUMENTS

| | | |
|---|---|---|
| JP | 09-147868 | 6/1997 |
| WO | WO 99/33125 | 7/1999 |
| WO | WO 99/33127 | 7/1999 |

* cited by examiner

*Primary Examiner*—Laura Weiner
(74) *Attorney, Agent, or Firm*—Staas & Halsey LLP

(57) ABSTRACT

A positive active material for a rechargeable lithium-sulfur battery includes a core of a sulfur compound and a surface-passivation layer formed on the core. The surface-passivation layer is made of a coating-element-included compound selected from the group consisting of a coating-element-included hydroxide, a coating-element-included oxyhydroxide, a coating-element-included oxycarbonate, a coating-element-included hydroxycarbonate, a mixture thereof.

30 Claims, 5 Drawing Sheets

_US 6,818,349 B2_

POSITIVE ACTIVE MATERIAL FOR RECHARGEABLE LITHIUM-SULFUR BATTERIES AND METHOD OF PREPARING SAME

CROSS REFERENCE TO RELATED APPLICATION

This application is based on Korean Patent Application No. 2001-66536, filed in the Korean Intellectual Property Office on Oct. 27, 2001, the disclosure of which is incorporated hereinto by reference.

BACKGROUND OF THE INVENTION

1. Field of the Invention

The present invention relates to a positive active material for a rechargeable lithium-sulfur battery and a method of preparing the same, and more particularly, to a positive active material for a rechargeable lithium-sulfur battery having an improved discharge voltage at high C-rates, and improved power and cycle-life characteristics, and a method of preparing the same.

2. Description of the Related Art

A rechargeable lithium-sulfur battery includes a positive active material including a sulfur-based compound having a sulfur-sulfur bond, and a negative active material including lithium metal or a carbonaceous material. The sulfur-based compound may be elemental sulfur ($S_8$) or an organo sulfur. The carbonaceous material is a material in which intercalation chemistry occurs, examples of which include graphite intercalation compounds, carbonaceous materials, and carbonaceous materials inserted with lithium. Upon discharge (electrochemical reduction), a sulfur-sulfur bond breaks, which results in a decrease in the oxidation number of S. Upon recharging (electrochemical oxidation), a sulfur-sulfur bond forms, which leads to an increase in the oxidation number of S.

Although such a rechargeable lithium-sulfur battery has a low discharge voltage (on the order of 2 V), a lithium-sulfur battery has been proposed as a next generation rechargeable battery following a lithium-ion battery and a lithium polymer battery since it has excellent stability, low cost, and high charge and discharge capacities. However, the lithium-sulfur battery has not yet been commercialized since it has low electrochemical activity. The low electrochemical activity results from the fact that $S_8$ is electrochemically inactive and that a passivation layer is formed on the surface of lithium metal, which results in a battery having a poor discharge voltage at a high C-rate and poor cycle-life characteristics.

In order to improve the electrochemical activity, it is proposed to add a certain material to the composition of the positive active material. The certain material is able to increase the absorption property of polysulfide.

By adding an absorption agent to a positive active material active mass, the mass is prevented from separating from a current collector. For the absorption agent, Japanese Patent Laid-open No. Hei. 9-147868 (Jun. 6, 1997) discloses an active carbon fiber. U.S. Pat. No. 5,919,587 discloses a method that, using a transition metal calcogenide having a highly porous, fibrous, and ultra-fine sponge-like structure, embeds the positive active material therein or encapsulates the positive active material therewith. Further, International Patent Publication No. WO 99/33125 discloses a microparticle having a high absorbent strength that is coated on a positive electrode or that is added into a positive active material mass. International Patent Publication No. WO 99/33127 discloses that, by using a cationic polymer including a quaternary ammonium salt group, the polysulfide anion is maintained around the cationic polymer.

However, there are continuing demands for further improved positive active materials, and especially for improvements in the discharge voltage at a high C-rate and the cycle-life characteristics.

SUMMARY OF THE INVENTION

It is an object of the present invention to provide a positive active material for a rechargeable lithium-sulfur battery cell exhibiting excellent cycle-life characteristics.

It is another object of the present invention to provide a positive active material for a rechargeable lithium-sulfur battery cell exhibiting excellent discharge voltage characteristics at a high C-rate.

It is yet another object of the present invention to provide a positive active material for a rechargeable lithium-sulfur battery cell exhibiting excellent power characteristics.

Additional objects and advantages of the invention will be set forth in part in the description which follows and, in part, will be obvious from the description, or may be learned by practice of the invention.

In order to achieve these and other objects, an embodiment of the present invention provides a positive active material for a rechargeable lithium-sulfur battery including a core of a sulfur compound and a surface-passivation layer of a coating element formed on the core.

According to an aspect of the invention, the surface-passivation layer is made of a coating-element-included compound selected from the group consisting of a coating-element-included hydroxide, a coating-element-included oxyhydroxide, a coating-element-included oxycarbonate, a coating-element-included hydroxycarbonate, and a mixture thereof.

According to another aspect of the invention, the coating element is Al, Si, or B.

According to yet another aspect of the invention, the coating element is B.

According to still another aspect of the invention, the coating-element-included compound includes hydrogen borate.

According to another embodiment of the invention, a method of preparing a positive active material for a rechargeable lithium-sulfur battery includes coating a sulfur compound with a coating liquid including a coating material source, and drying the coated sulfur compound.

According to a further aspect of the invention, the coating material source includes Al, Si, or B.

According to a still further aspect of the invention, the coating material source includes B.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE EMBODIMENTS

Figure 1:
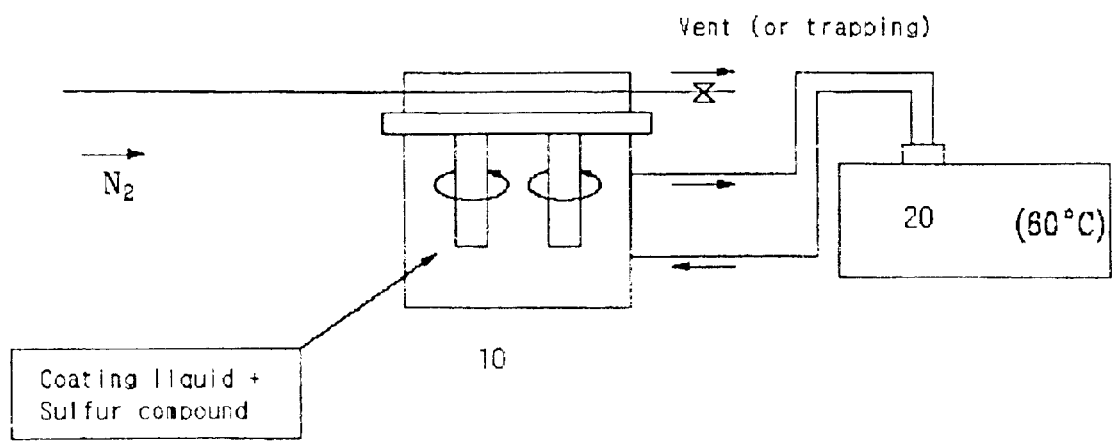
FIG. 1 is a schematic drawing showing a device used in a coating process according to an embodiment of the present invention.

Reference will now be made in detail to the present embodiments of the present invention, examples of which are illustrated in the accompanying drawings and in specific Examples. The embodiments are described below in order to explain the present invention by referring to the figures and specific Examples.

The present invention relates to a positive active material for a rechargeable lithium-sulfur battery having an improved power property, a high discharge voltage at a high C-rate, and improved cycle-life characteristics. These results and others are achieved by providing a sulfur compound, especially electrochemically-inactive elemental sulfur ($S_8$) powder coated with a surface-passivation layer. Thus, the surface morphology of the sulfur compound is modified, the wetting property thereof to an electrolyte is improved, and the electrochemical activity thereof is increased. As such, the positive active material of the present invention is modified on the surface thereof to improve the electrochemical activity and to prevent the dissolution of the sulfur compound powder during an electrochemical reaction.

The present invention provides a positive active material for a rechargeable lithium battery including a core of a sulfur compound and a surface-passivation layer of a coating element formed on the core. The surface-passivation layer is made of a coating-element-included compound selected from the group consisting of a coating-element-included hydroxide, a coating-element-included oxyhydroxide, a coating-element-included oxycarbonate, a coating-element-included hydroxycarbonate, and a mixture thereof according to embodiments of the invention.

The sulfur compound in the core according to embodiments of the invention include elemental sulfur ($S_8$), $Li_2S_n$ ($n \geq 1$), an organo sulfur compound, or a carbon-sulfur polymer (($C_2S_x)_n$, wherein x=2.5 to 50, n≥2). The surface-passivation layer includes at least one coating-element-included compound selected from the group consisting of a coating-element-included hydroxide, a coating-element-included oxyhydroxide, a coating-element-included oxycarbonate, and a coating-element-included hydroxycarbonate. The coating element compound is in an amorphous, semi-crystal, or crystal form according to embodiments of the invention. The coating element includes any element soluble in an organic solvent or water. According to embodiments of the invention, the coating element includes Mg, Al, Co, K, Na, Ca, Si, Ti, V, Sn, Ge, Ga, B, As, Zr, or a mixture thereof. Preferably, the coating element includes Al, Si, or B, and more preferably includes B.

To prepare the positive active material for a rechargeable lithium-sulfur battery of the present invention, the sulfur compound is encapsulated with a coating liquid including a coating material source. The coating liquid may be in a form of a solution or a suspension, and the solvent thereof may be an organic solvent or water.

If the organic solvent is used as a solvent, the coating liquid is prepared by adding the coating material source, such as a coating element and an alkoxide, a salt, and an oxide of the coating element, to the organic solvent. According to another embodiment, the mixture of the coating element source and the organic solvent are refluxed. Alternatively, if water is used as a solvent, the coating liquid is prepared by adding the coating material source such as a salt and an oxide of the coating element, to the water. According to a further embodiment, the mixture of the coating material source and water is refluxed. One having ordinary skill in the art can easily choose the suitable type of coating material source by considering the type of solvent. For example, the coating liquid including boron is prepared by dissolving $HB(OH)_2$, $B_2O_3$, or $H_{2B}O_3$ in organic solvent or water.

Examples of the organic solvent include, but are not limited to, an alcohol such as methanol, ethanol, and isopropanol; hexane; chloroform; tetrahydrofuran; ether; methylene chloride; and acetone.

According to another embodiment, an alkoxide coating solution is provided in which a coating-element-included alkoxide such as methoxide, ethoxide, or isopropoxide is dissolved in alcohol. One example of the alkoxide solution of the coating element is a tetraethylorthosilicate solution. The tetraethylorthosilicate solution is an ethanol solution of silicate.

When using water as a coating solvent, one example of a salt or an oxide of the coating element is vanadium oxide ($V_2O_5$) or a vanadate such as ammonium vanadate ($NH_4(VO_3)$).

A concentration of the coating material source is roughly at or between 0.1 and 50 wt % relative to the solvent according to an embodiment of the invention. Preferably, the concentration is at or between 5 and 30 wt % relative to the solvent. When the concentration thereof is below 0.1 wt %, the coating is not fully effective. When the concentration of the coating element source is more than 50 wt %, the resultant coating layer is thicker than desired.

The coating process according to embodiments of the invention include a general purpose coating method, such as a sputtering method, a chemical vapor deposition method, a dip coating method, and so on. The preferable coating method is the dip coating method since the process is performed in a simple way, such as by mixing the positive active material powder with the coating liquid to form a slurry, and then removing the excess coating solvent.

According to a further embodiment, the coating process includes a one-shot process in which, following the operation of forming the slurry, processes to remove the excess coating solvent and to additionally dry the resultant positive active material are performed at the same time. The method has advantages of simplicity and economy, as well as being capable of providing a more uniform surface-passivation layer on the surface of the sulfur source core.

In detail with reference to FIG. 1, the one-shot process includes introducing a sulfur source and a coating liquid into a mixer 10, and heating the mixer 10 while agitating it. Additionally, while not required in all aspects of the invention, blowing gas is injected into the mixer 10 to increase the reaction rate. The blowing gas may include $CO_2$ or a moisture-free inert gas, such as nitrogen gas or argon gas. Alternatively, the one-shot process may be performed under a vacuum rather than by using blowing gas.

While the coating liquid is coated on the surface of the sulfur compound, excess coating solvent is evaporated and removed by increasing the ambient temperature, and agitating. Thus, the slurry preparing operation, the solvent removing operation, and the drying operation are performed in a single mixing vessel instead of being individually performed in separate vessels. To obtain a uniform surface-passivation layer, a further operation of premixing the sulfur compound and the coating liquid may be performed for about 10 to 30 minutes following the introduction of the reactants into the mixer 10.

The temperature of the mixer 10 is increased by circulating hot water around the mixer 10. The hot water has a temperature at which the solvent is evaporated, usually at or between about 50 and about 100° C. The hot water may cool while circulating in the mixer 10, so the cooled water is heated with a heat exchanger 20 and re-circulated around the mixer 10.

The mixer 10 includes any mixer as long as it facilitates the mixing of the sulfur compound and the coating liquid and is capable of raising its inner temperature. The mixer 10 is preferably equipped with an inlet capable of injecting blowing gas, and of being maintained under a vacuum state. A planetary mixer is one example of the mixer 10. FIG. 1 shows a planetary mixer equipped with a heat exchanger used in one embodiment of the present invention. As shown in FIG. 1, a planetary mixer is equipped with an inlet for blowing nitrogen gas therein at an upper portion thereof, while hot water is circulated around the mixer 10 through the heat exchanger 20.

When the general purpose coating process is applied, the sulfur powder coated with the coating liquid is dried at or between room temperature and 200° C. for 1 to 24 hours. However, when the one-shot coating process is applied, the additional drying process is not required since the drying process is simultaneously performed with the coating process.

During the drying process, the coating liquid formed on the surface of the core is converted to a coating-element-included hydroxide upon reacting with moisture in the atmosphere. Thus, a surface-passivation layer can include coating-element-included hydroxide on the surface of the positive active material. Depending on the drying conditions, the surface-treatment layer may contain a coating-element-included hydroxide, a coating-element-included oxyhydroxide, a coating-element-included oxycarbonate, or a coating-element-included hydroxycarbonate. For example, if the drying process is performed under the atmosphere of a carbonate gas, the surface-treatment layer may predominantly contain the coating-element-included oxycarbonate or the coating-element-included hydroxycarbonate. Further, the surface-treatment layer can comprise at least two mixtures selected from coating-element-included hydroxide, coating-element-included oxyhydroxide, coating-element-included oxycarbonate, and coating-element-included hydroxycarbonate.

A thickness of the surface-passivation layer is at or between 1 and 300 nm according to an embodiment of the invention, and preferably at or between 1 and 50 nm. If the thickness is less than 1 nm, the effect of the surface-passivation layer on the battery performance is insignificant. If the thickness is more than 300 nm, the thickness is greater than desired. The concentration of the coating element in the surface-passivation layer is $2 \times 10^{-5}$ to 6 parts by weight, and preferably 0.01 to 6 parts by weight relative to 100 parts by weight of the sulfur compound according to embodiments of the invention.

Figure 6:
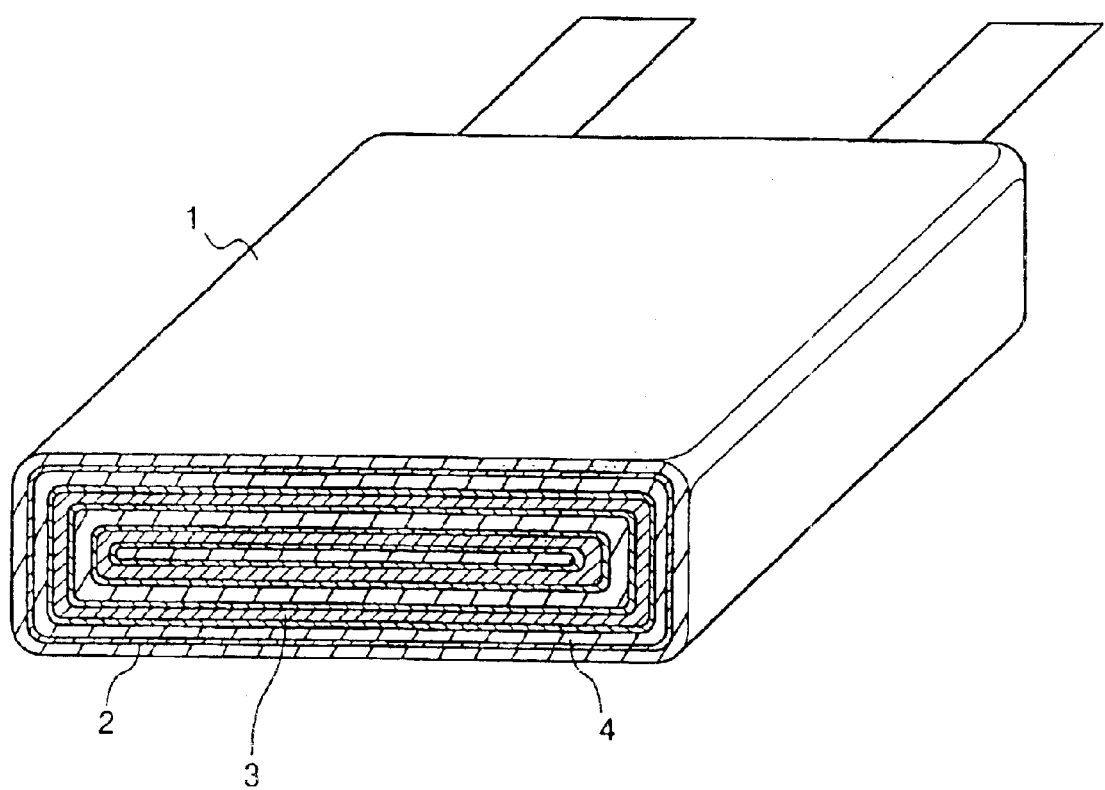
FIG. 6 shows a lithium secondary battery according to an embodiment of the present invention.

A lithium-sulfur battery according to an embodiment of the invention shown in FIG. 6 includes a case 1 containing a positive electrode 3, a negative electrode 4, and a separator 2 interposed between the positive electrode 3 and the negative electrode 4. An electrolyte is disposed between the positive and negative electrodes 3, 4. The positive electrode 3 includes the positive active material including the core of the sulfur compound and the surface-passivation layer formed on the core.

The following examples illustrate the present invention in further detail. However, it is understood that the present invention is not limited by these examples.

COMPARATIVE EXAMPLE 1

A positive active material of an elemental sulfur power (available from ALDRICH), a SUPER-P conductor (available from MMM CARBON), and a polyethylene oxide binder (Mw: 5,000,000, available from ALDRICH) were weighed in the weight ratio of 60:20:20, dissolved and uniformly distributed in acetonitrile to obtain a viscous slurry. The slurry was cast on a carbon-coated Al foil (available from REXAM) with a doctor blade to make a positive electrode. The energy density of the resultant positive electrode was 0.9 mAh/cm².

Using the prepared positive electrode and a 130 μm lithium metal counterpart electrode, a coin-type cell was assembled in a moisture-controlled glove box. An electrolyte of a 1 M $LiSO_3CF_3$ solution of 1,3-dioxolane/diglyme/sulforane/dimethoxy ethane (50/20/10/20 volume ratio) was used.

The cell was charged to 2.5 V at a current density of 0.2 mA/cm² and discharged to 1.5 V at various current densities. The battery capacity and cycle-life characteristics were then determined.

EXAMPLE 1

1 wt % Al-isopropoxide was added to 99 wt % ethanol solvent to obtain a 1% Al-isopropoxide coating suspension.

The 1 wt % Al-isopropoxide coating suspension and elemental sulfur ($S_8$) (available from ALDRICH) were introduced into a mixer 10 as shown in FIG. 1, and agitated. Following removal of the solvent, the resultant was dried at 70° C. to provide a positive active material for a lithium-sulfur battery.

EXAMPLE 2

A positive active material was prepared by the same procedure as in Example 1, except that a 5% Al-isopropoxide coating suspension that was prepared by adding 5 wt % Al-isopropoxide to 95 wt % ethanol solvent was used.

EXAMPLE 3

A positive active material was prepared by the same procedure as in Example 1, except that a 10%

Al-isopropoxide coating suspension that was prepared by adding 10 wt % Al-isopropoxide to 90 wt % ethanol solvent was used.

EXAMPLE 4

A positive active material was prepared by the same procedure as in Example 1, except that a 1% $B_2O_3$ coating suspension that was prepared by adding 1 wt % $B_2O_3$ to 99 wt % ethanol solvent was used.

EXAMPLE 5

A positive active material was prepared by the same procedure as in Example 1, except that a 5% $B_2O_3$ coating suspension that was prepared by adding 5 wt % $B_2O_3$ to 95 wt % ethanol solvent was used.

EXAMPLE 6

A positive active material was prepared by the same procedure as in Example 1, except that a 10% $B_2O_3$ coating suspension that was prepared by adding 10 wt % $B_2O_3$ to 90 wt % ethanol solvent was used.

EXAMPLE 7

A positive active material was prepared by the same procedure as in Example 1, except that a 20% $B_2O_3$ coating suspension that was prepared by adding 20 wt % $B_2O_3$ to 80 wt % ethanol solvent was used.

EXAMPLE 8

A positive active material was prepared by the same procedure as in Example 1, except that a 5% Si coating suspension that was prepared by adding 5 wt % tetraortosilicate (purity 98%, ALDRICH) to 95 wt % ethanol solvent was used.

EXAMPLE 9

A positive active material was prepared by the same procedure as in Example 1, except that a 10t % Si coating suspension that was prepared by adding 10 wt % tetraorthosilicate (purity 98%, ALDRICH) to 90 wt % ethanol solvent was used.

The coin cells fabricated by the method according to using the positive active material of Examples 4 to 6 and the lithium coin battery of Comparative Example 1. The coin cells were charged at 0.2 C, 0.5 C, and 1 C, respectively, and the voltage thereof was measured. The resulting midpoint voltages thereof are shown in the following Table 1.

TABLE 1

| | Discharge Voltage (V) | | | |
| --- | --- | --- | --- | --- |
| | 0.1 C | 0.2 C | 0.5 C | 1 C |
| Comparative Example 1 | 2.08 | 2.08 | 2.04 | 1.97 |
| Example 4 | 2.08 | 2.09 | 2.05 | 1.99 |
| Example 5 | 2.08 | 2.09 | 2.05 | 2.00 |
| Example 6 | 2.08 | 2.09 | 2.06 | 2.01 |

As shown in Table 1, the positive active materials according to Examples 4 to 6, which were coated with a surface-passivation layer on the surface thereof, have a higher discharge voltage at high C-rates than the positive active material of Comparative Example 1.

Figure 2A:
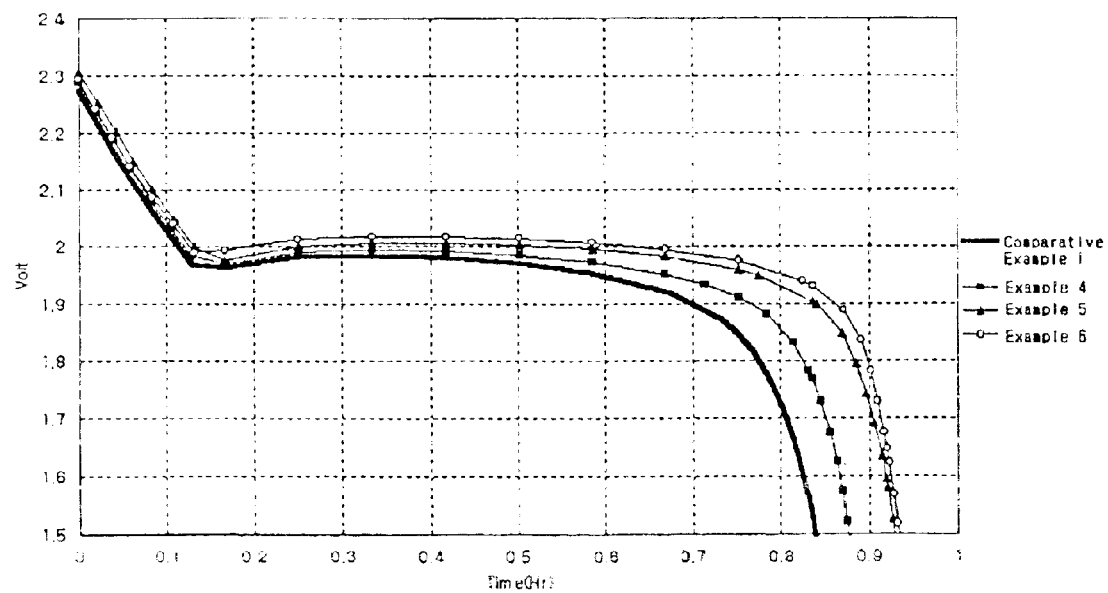
FIG. 2A is a graph showing a discharge voltage at 1C of cells using positive active materials according to Examples 4 to 6 of embodiments of the present invention and Comparative Example 1.

Further, the coin cells of Examples 4 to 6 and Comparative Example 1 were charged and discharged at a 1C rate, and the discharge properties were measured. The results are shown in FIG. 2A. As shown in FIG. 2A, the positive active materials of Examples 4 to 6 maintain the discharge voltage at a high level compared with that of Comparative Example 1, for an extended period. It was shown that, as the content of boron increases, the discharge voltage maintenance characteristics are improved.

Figure 2B:
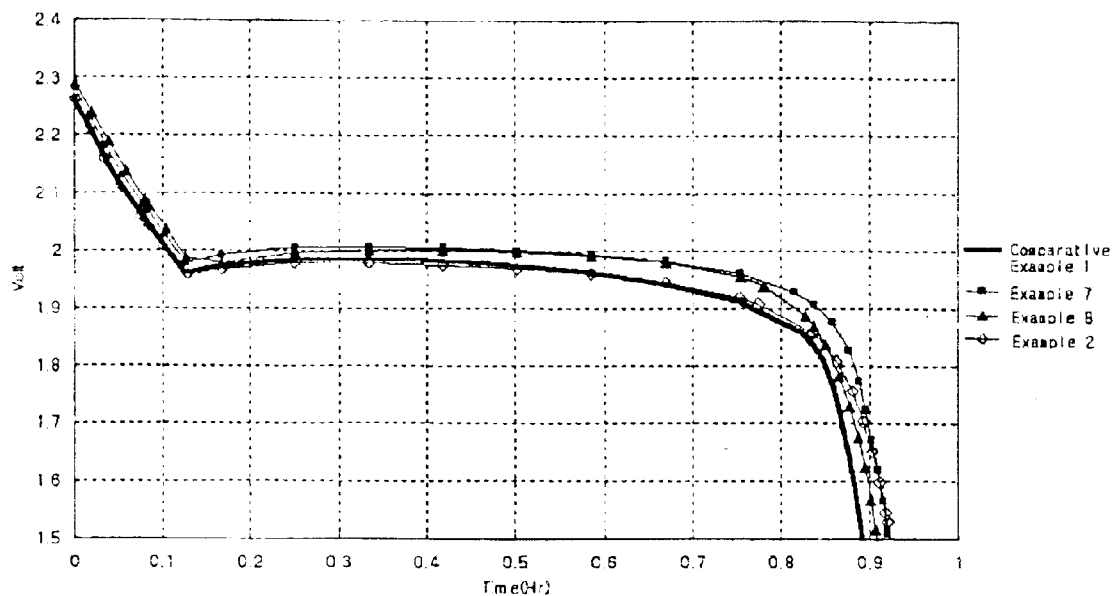
FIG. 2B is a graph showing a discharge voltage at 1C of cells using positive active materials according to Examples 2, 7 to 8 of embodiments of the present invention and Comparative Example 1.

To identify the effect by addition of B, Si, and Al, the coin cells using Examples 2, 7 to 8, and Comparative Example 1 were charged and discharged at a 1C rate, and the discharge properties were measured. The results are presented in FIG. 2B. It was evident from FIG. 2B that the positive active material with B of Example 7 maintained the discharge voltage at a highest level as compared to the positive active material with Si of Example 8, the positive active material with Al of Example 2, and the positive active material of Comparative Example 1, for an extended period.

Figure 2C:
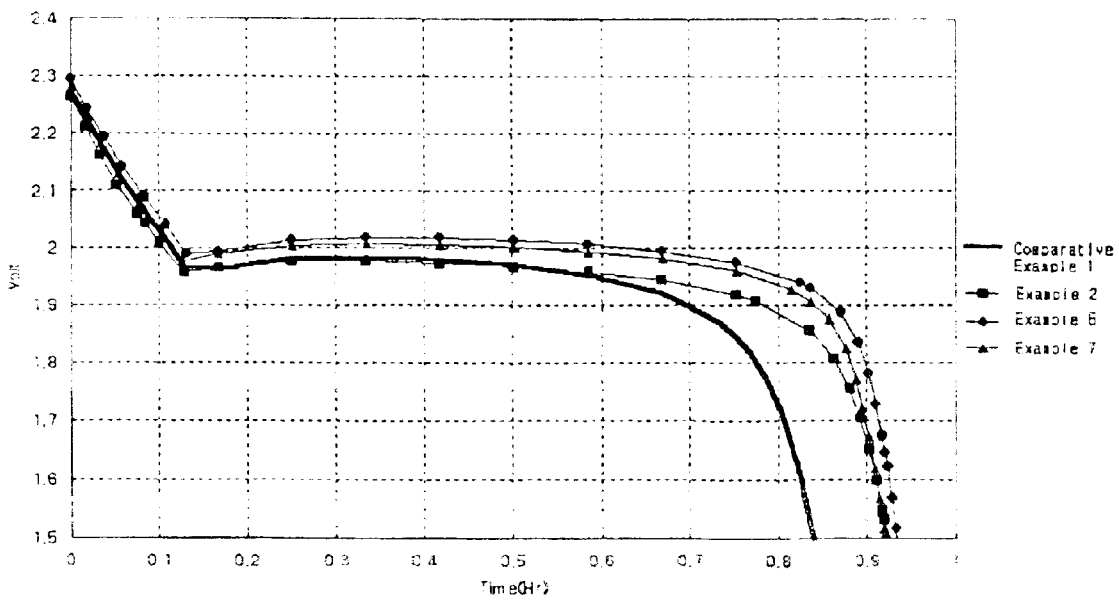
FIG. 2C is a graph showing a discharge voltage at 1C of cells using positive active materials according to Examples 2, 6 to 7 of embodiments of the present invention and Comparative Example 1.

In addition, it was shown from FIG. 2C that the discharge properties results according to Examples 2, 6–7, and Comparative Example 1 that the positive active material with the use of a 10% $B_2O_3$ ethanol suspension maintained the discharge voltage at a highest level, as compared to that which used a 20% $B_2O_3$ ethanol suspension, and that which used a 5% $Al_2O_3$ isopropoxide suspension, and that of Comparative Example 1, for an extended period.

Figure 3:
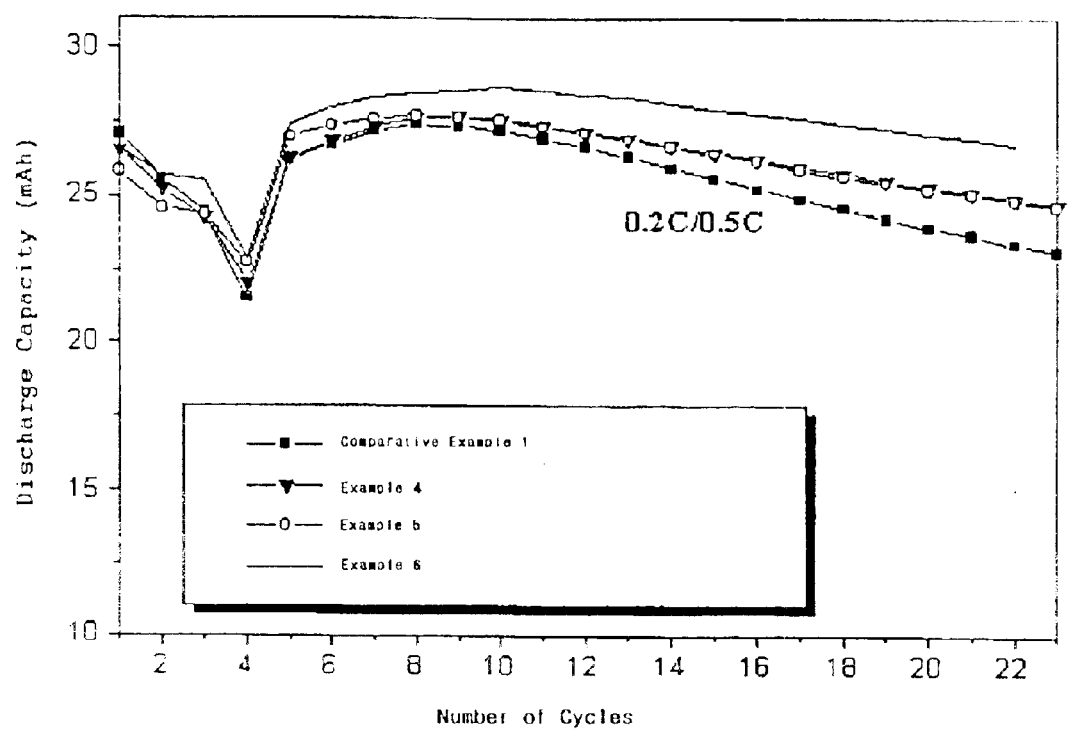
FIG. 3 is a graph showing cycle-life characteristics of cells using positive active materials according to Examples 4 to 6 of embodiments of the present invention and Comparative Example 1.

The coin cells of Examples 4 to 6 and Comparative Example 1 were charged and discharged at 0.2C and 0.5C rates for 20 cycles, and the cycle-life characteristics were measured. The results are shown in FIG. 3. As shown in FIG. 3, the capacity-maintaining ratio following 20 cycles for Example 4 was 99.91%, that of Example 5 was 99.92%, that of Example 6 was 99.97%, and that of Comparative Example 1 was 99.89%. That is, it is understood that the positive active materials of Examples 4 to 6 have improved cycle-life characteristics over that of Comparative Example 1.

Figure 4:
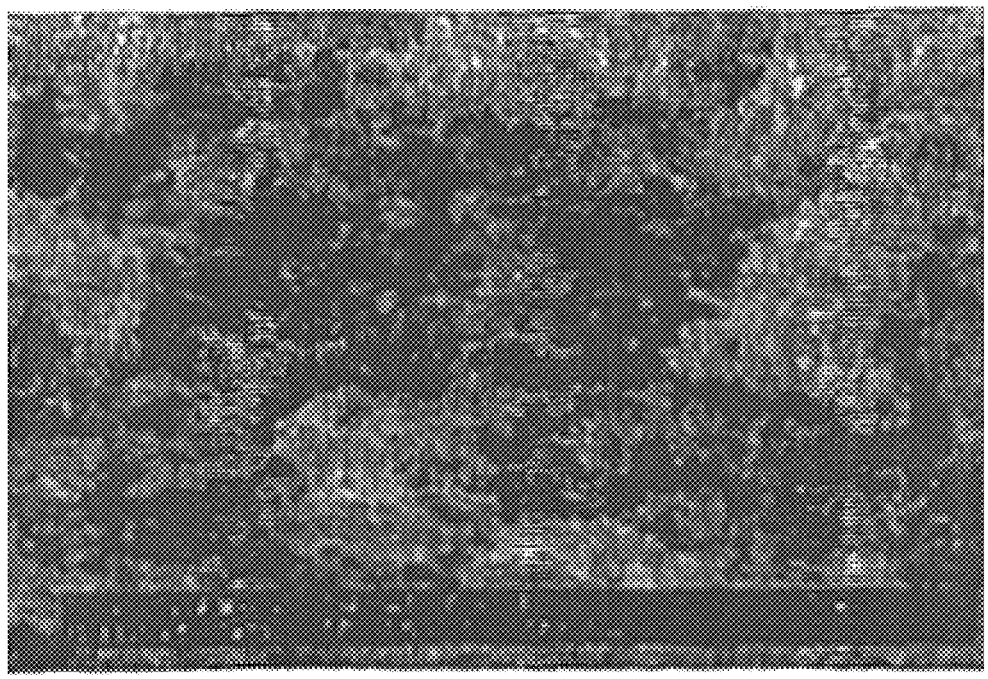
FIG. 4 is a SEM photograph of a positive active material according to Example 6 of an embodiment of the present invention.
Figure 5:
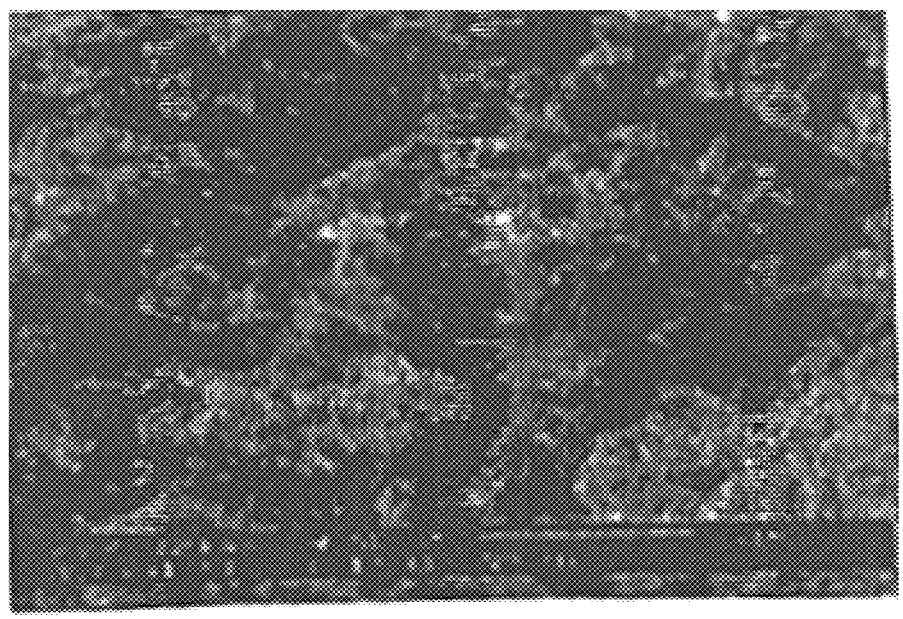
FIG. 5 is a SEM photograph of a positive active material according to the Comparative Example 1.

FIGS. 4 and 5 show SEM photographs of positive active materials of Example 6 and Comparative Example 1, respectively. As shown in FIGS. 4 and 5, the surface morphology of Example 6 is similar to that of Comparative Example 1.

As mentioned above, the present invention provides a positive active material that is coated with a surface-passivation layer, having an improved discharge voltage and improved cycle-life characteristics.

While the present invention has been described in detail with reference to the preferred embodiments, those skilled in the art will appreciate that various modifications and substitutions can be made thereto without departing from the spirit and scope of the present invention as set forth in the accompanying claims and equivalents thereof.

What is claimed is:

1. A positive active material for a rechargeable lithium-sulfur battery comprising:
   a core of a sulfur compound; and
   a surface-passivation layer formed on the core using a coating element, the surface-passivation layer comprising a coating-element-included compound selected from the group consisting of a coating-element-included hydroxide, a coating-element-included oxyhydroxide, a coating-element-included oxycarbonate, a coating-element-included hydroxycarbonate, hydrogen borate, and a mixture thereof.

2. The positive active material according to claim 1, wherein the sulfur compound is selected from the group consisting of an elemental sulfur ($S_8$), $Li_2S_n(n \geq 1)$, an organo sulfur compound, and a carbon-sulfur based polymer.

3. The positive active material according to claim 1, wherein the coating element is soluble in an organic solvent or water.

4. The positive active material according to claim 3, wherein the coating element is selected from the group consisting of Mg, Al, Co, K, Na, Ca, Si, Ti, V, Sn, Ge, Ga, B, As, Zr, and a mixture thereof.

5. The positive active material according to claim 4, wherein the coating element is selected from the group consisting of Al, Si, B, and a mixture thereof.

6. The positive active material according to claim 5, wherein the coating element is B.

7. The positive active material according to claim 1, wherein the coating element compound is in an amorphous, semi-crystal, or crystal form.

8. The positive active material according to claim 1, wherein said surface-passivation layer has a thickness of at or between 1 and 300 nm.

9. The positive active material according to claim 8, wherein said surface-passivation layer has the thickness of at or between 1 and 50 nm.

10. The positive active material according to claim 1, wherein the coating element is present at or between $2 \times 10^{-5}$ and 6 parts by weight based on 100 parts by weight of the sulfur compound.

11. The positive active material according to claim 10, wherein the coating element is present at or between 0.01 and 6 parts by weight relative to 100 parts by weight of the sulfur compound.

12. The positive active material according to claim 1, wherein said surface-passivation layer is formed on the core by:
    adding the sulfur compound and a coating liquid including the coating element to a vessel of a mixer, and
    agitating while heating the sulfur compound and the coating liquid in the vessel so as to form said surface-passivation layer on the sulfur compound.

13. The positive active material according to claim 12, wherein said surface-passivation layer is further formed by premixing the sulfur compound and the coating liquid prior to performing the one-shot process.

14. The positive active material according to claim 12, wherein the coating element is boron, and said formed surface-passivation layer comprises the hydrogen borate.

15. A positive active material for a rechargeable lithium-sulfur battery comprising:
    a core of a sulfur compound; and
    a surface-passivation layer formed on the core, the surface-passivation layer comprising hydrogen borate.

16. The positive active material according to claim 15, wherein the sulfur compound is selected from the group consisting of elemental sulfur ($S_8$), $Li_2S_n (n \geq 1)$, an organo sulfur compound, and a carbon-sulfur based polymer.

17. The positive active material according to claim 15, wherein the hydrogen borate is in an amorphous, semi-crystal, or crystal form.

18. The positive active material according to claim 15, wherein said surface-passivation layer has a thickness of at or between 1 and 300 nm.

19. The positive active material according to claim 18, wherein said surface-passivation layer has the thickness of at or between 1 and 50 nm.

20. The positive active material according to claim 15, wherein the coating element is present at or between $2 \times 10^{-5}$ and 6 parts by weight relative to 100 parts by weight of the sulfur compound.

21. The positive active material according to claim 20, wherein the coating element is present at or between 0.01 and 6 parts by weight relative to 100 parts by weight of the sulfur compound.

22. A lithium-sulfur battery comprising,
    a positive electrode including a positive active material, the positive active material comprising:
        a core of a sulfur compound, and
        a surface-passivation layer formed on the core using a coating element, the surface-passivation layer comprising a coating-element-included compound selected from the group consisting of a coating-element-included hydroxide, a coating-element-included oxyhydroxide, a coating-element-included oxycarbonate, a coating-element-included hydroxycarbonate, hydrogen borate and a mixture thereof;
    a negative electrode comprising a negative active material including lithium metal or a carbonaceous material; and
    an electrolyte disposed between said positive and negative electrodes.

23. The lithium-sulfur battery according to claim 22, wherein the coating element is selected from the group consisting of Mg, Al, Co, K, Na, Ca, Si, Ti, V, Sn, Ge, Ga, B, As, Zr, and a mixture thereof.

24. The lithium-sulfur battery according to claim 22, wherein the coating element is selected from the group consisting of Al, Si, B, and a mixture thereof.

25. The lithium-sulfur battery according to claim 22, wherein the coating element is B.

26. The lithium-sulfur battery according to claim 22, wherein the surface-passivation layer has a thickness of at or between 1 and 300 nm.

27. The lithium-sulfur battery according to claim 22, wherein the surface-passivation layer has the thickness of at or between 1 and 50 nm.

28. The lithium-sulfur battery according to claim 22, wherein the coating element is present at or between $2 \times 10^{-5}$ and 6 parts by weight relative to 100 parts by weight of the sulfur compound.

29. The lithium-sulfur battery according to claim 22, wherein the coating element is present at or between 0.01 and 6 parts by weight relative to 100 parts by weight of the sulfur compound.

30. The lithium-sulfur battery according to claim 22, wherein the surface-passivation layer comprises the hydrogen borate.

* * * * *